United States Patent [19]

Terasawa

[11] Patent Number: 5,896,286
[45] Date of Patent: Apr. 20, 1999

[54] POWER SEMICONDUCTOR MODULE

[75] Inventor: Noriho Terasawa, Nagano, Japan

[73] Assignee: Fuji Electric Co., Ltd., Kawasaki, Japan

[21] Appl. No.: 08/804,165

[22] Filed: Feb. 20, 1997

[30] Foreign Application Priority Data

Feb. 23, 1996 [JP] Japan ................................ 8-035981

[51] Int. Cl.$^6$ ................................................ H02M 7/5387
[52] U.S. Cl. .................................................... 363/132; 363/98
[58] Field of Search ................................ 363/17, 98, 132, 363/144; 361/728, 736, 748, 760

[56] References Cited

U.S. PATENT DOCUMENTS

| | | | |
|---|---|---|---|
| 4,967,336 | 10/1990 | Davies et al. | 363/132 |
| 5,280,228 | 1/1994 | Kanouda et al. | 318/803 |
| 5,412,558 | 5/1995 | Sakurai et al. | 363/98 |
| 5,519,306 | 5/1996 | Itoh et al. | 323/222 |

FOREIGN PATENT DOCUMENTS 5-13562  1/1993  Japan .

*Primary Examiner*—Matthew Nguyen
*Attorney, Agent, or Firm*—Kanesaka & Takeuchi

[57] ABSTRACT

A power semiconductor module with a bridge circuit is housed in a common case. The module includes a plurality of element chips separated into groups for semiconductor elements, a plurality of drive chips, and a signal processing chip formed as an integrated circuit. Each drive chip is formed as an integrated drive circuit and is connected to each semiconductor element to correspond thereto. Each drive chip operates at a potential corresponding to each semiconductor element. The signal processing chip is connected to the drive chips to be shared commonly by the drive chips. The signal processing chip processes signals associated with the drive chips in such a way that the signals are compatible with the potentials of the drive chips. Cost and performance of the module is improved.

8 Claims, 2 Drawing Sheets

POWER SEMICONDUCTOR MODULE

BACKGROUND OF THE INVENTION AND RELATED ART STATEMENT

The present invention relates to a power semiconductor module that incorporates a plurality of semiconductor elements constituting a bridge circuit, such as an insulating gate bipolar transistor (hereafter referred to as an "IGBT"), a bipolar transistor, or a MOS transistor, together with related circuits. The module is used to drive a load, such as an electric motor.

The power semiconductor elements, such as IGBTS, described above, which are used to drive various loads, such as electric motors, are generally incorporated in devices as individual elements housed in a package. In 2- or 3-phase bridge circuit devices using four to six power semiconductor elements, however, these semiconductor elements can be mounted as chips on a heat sink or an insulating substrate thermally closely coupled thereto, which is then housed in a case. This module is advantageous due to its reduced overall size and thermal radiation. Furthermore, the recent tendency is to incorporate into this module an integrated circuit chip comprising a combination of the power semiconductor elements and related circuits, such as drive circuits for the elements. This invention relates to a semiconductor module incorporating a plurality of power semiconductor elements together with related circuits as described above, and FIG. 2 shows a typical conventional example.

The module 70 shown in FIG. 2 comprises a 3-phase bridge circuit including six IGBTs 10 and related circuits, both of which are incorporated in a case 60. The module 70 is a small power inverter that receives at its positive and negative input terminals P and N a DC voltage from a power supply 1 (on the left of this figure) to drive a load 2, such as an electric motor, connected to three output terminals U, V, and W (on the right of this figure), in response to instructions from a controller 3 (at the bottom of this figure) that is a microcomputer.

Each of the IGBTs forming the three semiconductor elements 10 on each of the upper and lower arms of the bridge circuit includes an auxiliary emitter 10a for detecting a current and has a free wheeling diode 11 connected in reverse parallel therewith so as to allow the module to function as an inverter. These semiconductor elements 10 and diodes 11 are mounted as chips on a heat sink or a ceramic substrate thermally closely coupled thereto, which are then housed in a plastic frame-like case 60 together with wiring conductors 40 required to connect these elements together or with terminals. An epoxy resin is then poured into the case to integrate the elements into a module 70 having a robust structure. For the purposes of illustration, the input and output terminals are shown to protrude laterally from the case 60, but in fact, they are generally drawn out from the top surface of the case 60.

A circuit for controlling the plurality of power semiconductor elements is integrated as a single chip and incorporated in the case 60 of the module 70 as a controller 80. The controller 80, which includes drive protection circuits 81 and 82 corresponding to the semiconductor elements 10 on the upper and lower arms, is connected to the controller 3 via a bus 3a and a group of terminals Tc, and receives from the controller 3 three control signals (u), (v) and (w) for the output terminals U, V and W for three phases to issue a corresponding drive instruction Sd from the drive protection circuits 81 and 82 to the corresponding semiconductor elements 10. When a defect occurs, the controller 80 receives an electric signal Si from the auxiliary emitter 10a of the semiconductor elements 10 at the drive protection circuits 81 and 82 to stop the drive instruction Sd in order to protect the semiconductor elements 10 while sending a warning signal Sa to the controller 3.

The controller 80 can be operated by applying a low power voltage Ed thereto, and the ground potential Ee can be set at the same potential as the negative input terminal N of the power bridge circuit as shown in the figure. Since, however, the drive protection circuits 81 and 82 must be operated at the same potential as the corresponding semiconductor elements 10, the emitter potentials of the semiconductor elements 10 are provided to these circuits via a potential transmission lines 42. Since the three semiconductor elements on the upper arm operate at different emitter potentials, power voltages Eu, Ev and Ew are provided to the corresponding drive protection circuits 81, respectively, via feeding lines 41. On the other hand, the three semiconductor elements 10 on the lower arm are operated at the same emitter potentials, so a power voltage Ec is commonly provided to the corresponding drive protection circuits 82 via a feeding line 41'. The reference potential for the power voltages Eu, Ev and Ew must be a higher voltage similar to that in the positive input terminal P of the bridge circuit.

Although the size and cost of the conventional module 70 described above are significantly improved as compared to a structure with individual elements, this module has also cost and performance problems as the range of its application increases. The largest problem in cost is the difficulty in reducing the size of the controller chip 80, to thereby cause high cost. This is because a large chip area is required to join and separate the controller body and the drive protection circuits 81 and 82, especially the circuits 81, which operate at different potentials as described above when these components are incorporated into the controller 80. In other words, the area required for such pn junction isolation can not be reduced no matter how highly these circuits are integrated. Accordingly, the chip size cannot be reduced below a certain limit, and this prevents the cost from being reduced sufficiently.

The second problem in cost is the large number of lines including the signal lines 50 between the plurality of semiconductor elements 10 constituting the bridge circuit and the controller 80, and the feeding lines 41 and potential transmission lines 42 to the controller 80, as well as the large amount of labor required to connect these lines. In particular, the improvement of the protection level for the semiconductor elements 10 has recently been requested. Also, in order to provide not only overcurrent protection but also short-circuit and overheat protections, the number of signal lines 50 must be increased correspondingly, resulting in increase of the amount of labor. In addition, in order to prevent the internal connection lines from becoming complicated, the size of the case 60 and thus the module 70 must be increased.

A performance problem is that malfunction caused by entering or invading of noise into the signal lines 50 or the interference of signals with each other happens easily. That is, since the signal lines 50 must be as short as possible due to the structure of the module 70, the lines 50 unavoidably pick up noise. In addition, the drive instruction Sd and the current signal Si are both sharp pulse-like signals and the lines 50 are likely to be complicated or mixed if there are a large number of signal lines 50, so that interference is likely to happen with each other. To avoid noise and signal interference, electrostatic shielding can be effectively applied to the signal lines 50 and the controller chip 80. In this case, however, it must have a disadvantage in size and cost.

In view of the above problems, it is an object of the invention to keep the most of the above advantages that the semiconductor module for the power bridge circuit has and to improve the module in terms of cost and performance.

SUMMARY OF THE INVENTION

According to the invention, the above object can be achieved by a semiconductor module comprising a plurality of element chips separated into groups of power semiconductor elements; a plurality of drive chips comprising integrated drive circuits, each being provided so as to correspond to each semiconductor element and to operate at a potential of the semiconductor element; a signal processing chip comprising an integrated circuit which is provided so as to share with the drive chips and which processes signals associated with the drive chips in such a way that the signals will be compatible with the operation potentials of the drive chips; wiring conductors for the plurality of semiconductor elements; and signal lines for connecting the plurality of drive chips and the signal processing chip together. All the chips and members are housed in a common case.

In the semiconductor module according to the invention, the function of the controller 80 of the conventional signal chip structure described in FIG. 2 is shared by the drive chips and the signal processing chip described above, and the drive chip is provided for each semiconductor element and operated at the same potential as the semiconductor element. Thus, the invention does not require internal pn junction isolation of the body and the drive protection circuit as in conventional controller chip, thereby enabling the drive and signal processing chips to be highly integrated to reduce the size and cost of the chips. Furthermore, the invention can reduce the need to transmit signals to and from the signal processing chip even if the drive chip has an advanced function for protecting the semiconductor element, which is not provided by the conventional technique. Consequently, it can minimize the number of the signal lines to simplify the internal wiring of the module, thereby reducing the cost. It can also reduce the possibility of malfunction caused by the entry of noise and the interference of signals with each other, thus improving performance.

The drive chip preferably incorporates a protection circuit as well as a drive circuit for each semiconductor element. When a defect occurs, this protection circuit can protect the semiconductor element while sending to the signal processing chip a defect signal indicating that a defect has occurred. Advantageously, the drive chip has the same circuit configuration for all the semiconductor elements in the bridge circuit, and is disposed as close as possible to the element chip. In the bridge circuit, the free wheeling diode must be connected in reverse parallel with the semiconductor element, and this diode chip is advantageously disposed as close as possible to the element chip.

In addition, in regard to the feeding lines to the drive chips for the semiconductor elements constituting the bridge circuit, it is reasonable that the feeding lines for each drive chip on the upper-arm side of the bridge circuit are formed separately, while a common feeding line is used for the plurality of drive chips on the lower-arm side.

According to the invention, the drive chip is operated at the same potential as the corresponding semiconductor element in the bridge circuit. Thus, in order to exchange signals between the drive chip and the signal processing chip, the potential of the signals must be matched. For this purpose, the operation potential of each semiconductor element may be transmitted to the signal processing chip via the potential transmission line. Advantageously, a potential transmission line is provided for each semiconductor element on the upper-arm sides, while it is provided so as to be shared by the plurality of semiconductor elements on the lower-arm sides. A level shift circuit is advantageously incorporated in the signal processing chip to match the potential of the signal transmitted between the signal processing chip and the drive chip corresponding to the semiconductor element on the upper arm that has high voltage.

DETAILED DESCRIPTION OF PREFERRED EMBODIMENTS

Figure 1:
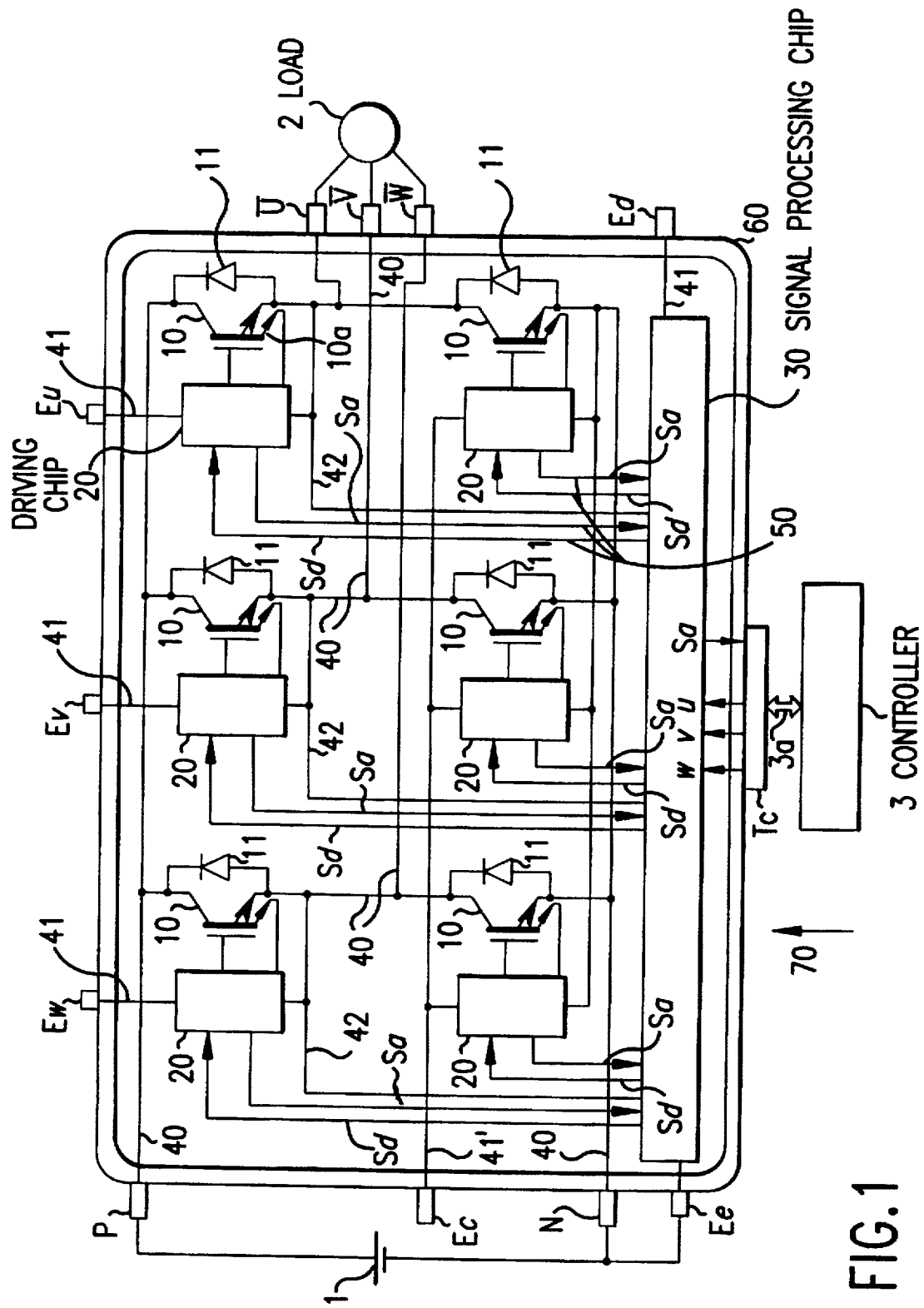
FIG. 1 is a circuit diagram showing an embodiment of a power semiconductor module according to the invention.
Figure 2:
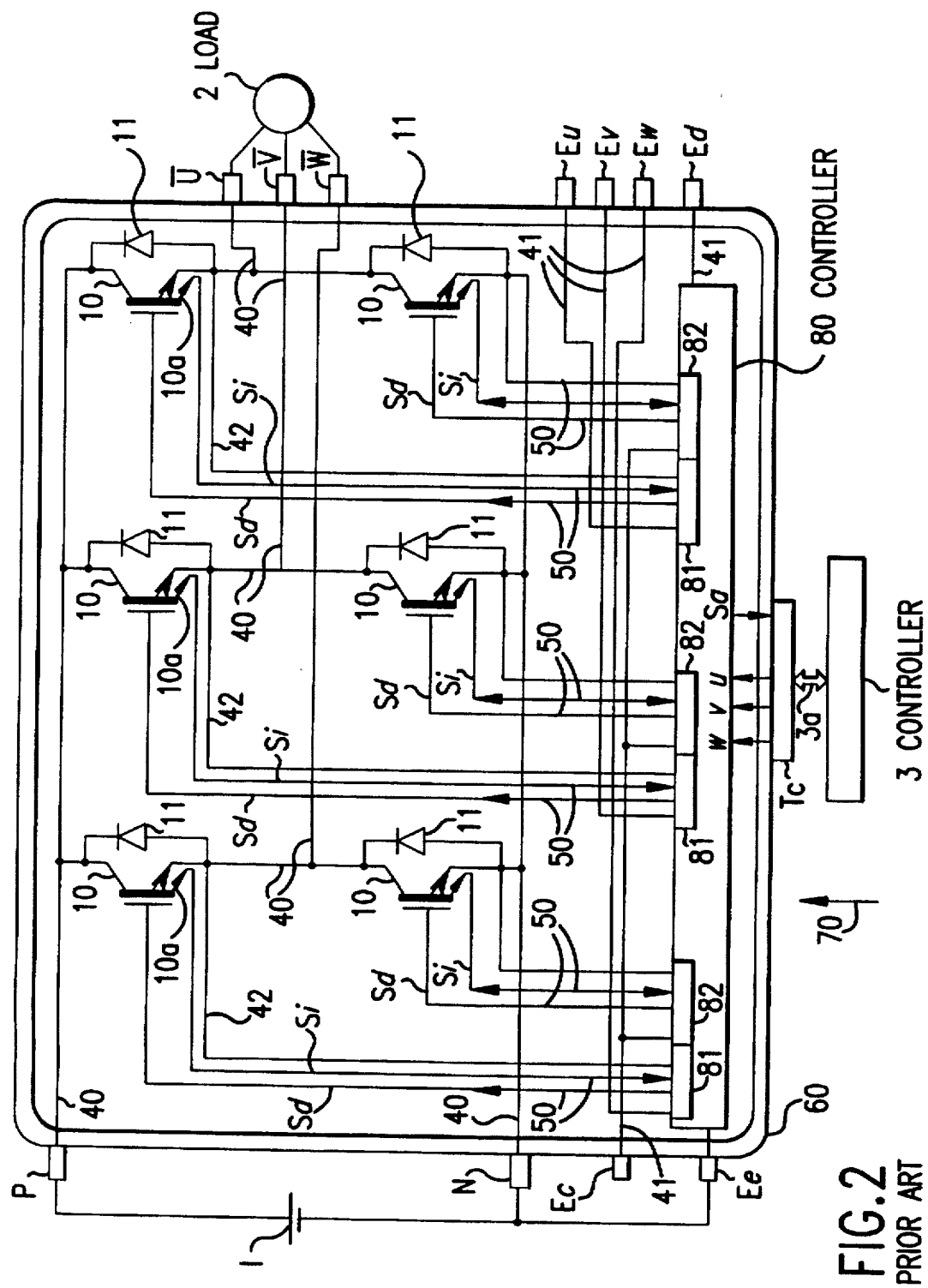
FIG. 2 is a circuit diagram of a conventional power semiconductor module.

A preferred embodiment of the invention is described below with reference to the circuit diagram in FIG. 1. Since parts in FIG. 1 corresponding to FIG. 2 have the same reference numerals as those in FIG. 2, the description of the duplicate parts is omitted. In the example in FIG. 1, the power semiconductor elements for forming the bridge circuit are IGBTs, as in FIG. 2, but in this embodiment, bipolar or MOS transistors may be used, as well.

The respective three power semiconductor element chips 10 on the respective upper and lower arms of the 3-phase bridge circuit are mounted in position on a metallic or ceramic substrate thermally closely coupled to a heat sink for heat radiation. The free wheeling diode 11 different from the element chip is mounted close to each element chip 10 and connected in reverse parallel therewith using means such as bonding. The six element chips 10 are firmly connected to the pair of positive and negative input terminals P and N and the three output terminals U, V, and W via wiring conductors 40, which are copper bars as in the conventional technique, and the element chips 10 on the upper arms are connected to the corresponding element chips on the lower arms, respectively, via the wiring conductors 40.

According to this invention, a drive chip 20 shown by a block 20, housed in the case 60 of the module 70 together with the plurality of the element chips 10 and drive chips 20, and connected to the controller 3 via the bus 3a and terminals Tc. The signal processing chip 30 receives the control signals (u), (v) and (w) from the controller 3 to distribute the drive instruction signals Sd based on the control signals among the plurality of drive chips 20 via the signal lines 50, and when a defect occurs, the processing chip 30 receives the defect signal Sa from the drive chip 20 to stop or change the drive instruction Sd while delivering it to the controller 3 as the warning signal Sa. A level shift circuit is also incorporated in the signal processing chip 30 to match the potential level required to transmit the drive instruction Sd and defect signal Sa to and from the drive chips 20 corresponding to the semiconductor elements on the upper-arm side, which has a higher voltage.

The signal processing chip 30 receives the low power voltage Ed and operates on the same ground potential Ee as the negative input terminal N of the bridge circuit, but the signal processing chip 30 receives via the potential transmission line 42 the emitter potential of each semiconductor element, which is a referential operation potential on the upper arm side in connection with the level shift circuit. On the lower-arm side with a low voltage, however, all the semiconductor elements are operated on a common potential, which is the same as the potential of the negative input terminal N, so the level shift circuit for the drive instruction Sd and the defect signal Sa need not be incorporated in the signal processing chip 30. Thus, since the emitter potentials for these instruction Sd and signal Sa need not be provided to the signal in the figure is provided for each element chip 10 and operated at the same potential as the element chip 10. The drive chip 20 is an integrated circuit incorporating a drive circuit for operating the gate of the corresponding semiconductor element. In the embodiment in the figure, however, a protection circuit is also installed in the drive chip 20. The drive chip 20 is located as close as possible to each element chip 10 and is connected to the gate of the semiconductor element and auxiliary emitter 10a so as to drive the gate of the semiconductor element and perform protection operation, such as emergency stop, that is required when a defect, such as overcurrent or load short-circuit, occurs.

Of course, the drive chips 20 may have the same circuit configurations for all the semiconductor elements, but since the groups of the semiconductor elements on the upper and lower arm sides have different operation voltages, feed voltages Eu, Ev and Ew are provided to the three drive chips 20 on the upper-arm side via the respective feeding lines 41, while a feed voltage Ec is provided to the three drive chips 20 on the lower-arm side via the common feeding line 41', as shown in the figure. These voltages may be several to several teens of volt. Furthermore, in order to operate each drive chip 20 at the same potential as the corresponding semiconductor element, each semiconductor element on the upper-arm side is provided with the emitter potential corresponding to each drive chip 20, while on the lower-arm side, the semiconductors elements are provided with the same emitter potentials to all the drive chips 20.

A signal processing chip 30 is a single integrated circuit chip provided so as to be shared by the plurality of drive chips processing chip 30, the power transmission line is omitted in the figure. If this line is provided to stabilize the signal potential, a single line may be installed so as to be shared by the plurality of semiconductor elements on the lower-arm side. The level shift circuit may comprise a general resistance-type potential divider and a transistor that is turned on and off in response to instructions and signals directly connected to the low or high-voltage side of the divider.

According to the invention, the plurality of element chips 10 and drive chips 20 and the single signal processing chip 30 are housed in a common case 60 together with connection conductors 40 and signal lines 50, and a resin is poured into the case to obtain a sturdy integral semiconductor module 70. The module 70 can be used in a wide range of applications by providing the element chips 10 with voltage and current ratings suitable to drive the load 2, and the drive chip 20 and the signal processing chip 30 can drive various loads 2 without changes to their circuit configurations. It is advantageous that control contents and forms which individually conform to various applications of the module 70 and various types of loads are stored in a software for the microcomputer by using the microcomputer as the controller 3.

As described above, in the semiconductor module 70 according to the invention, since the drive chip 20 is operated at the same potential as the element chip 10, it requires no pn junction isolation. Consequently, small and inexpensive drive chips can be manufactured by using high-level integration. The cost of the signal processing chip 30 can be similarly reduced by using high-level integration while pn junction isolation is only made for the level shift circuit section. In addition, if the drive chip 20 has an advanced protection function, the defect signal Sa, which is a logic signal indicating the occurrence of a defect and the type of the defect, may be transmitted to the signal processing chip 30. As a result, the number of signal lines 50 can be minimized, and the possibility of malfunction caused by the entry of noise or the interference of instructions or signals with each other can be significantly reduced. According to this invention, the signal lines 50 and the potential transmission lines 42 described above may comprise wiring conductors formed on a printed circuit board in order to reduce the cost of assembling the module 70.

According to the power semiconductor module of the invention, the element chips separated into respective groups of the plurality of semiconductor elements for constituting the bridge circuit; drive chips comprising integrated drive circuits, each being provided so as to correspond to the element chip and to operate at the same potential as the corresponding element chip; a signal processing chip comprising an integrated circuit which is provided so as to be shared by the drive chips and processes a signal associated with the drive chips in such a way that the signal will be compatible with the operation potential of the drive chips; wiring conductors for the plurality of semiconductor elements; and signal lines for connecting the plurality of drive chips and the signal processing chip together, are housed in a common case. Therefore, the following effects can be obtained.

(a) Since the drive chip is provided for each semiconductor element in the bridge circuit and operated at the same potential as the element, pn junction isolation structure need not be formed inside the module. The size and cost of the drive chips can be reduced by using high-level integration.

(b) The size of the circuit to be incorporated in the signal processing chip is much smaller than that formed in the conventional technique, and a pn junction isolation structure is required only for the level shift circuit section. Thus, the size and cost of the signal processing chip can be reduced by using high-level integration, so that the size of the total module and the manufacturing costs can be reduced.

(c) Even if the drive chip includes a function for protecting the semiconductor element, the defect signal may be provided to the signal processing chip in the form of a logic signal. Thus, the possibility of malfunction caused by the entry of noise or the interference of signals with each other can be significantly reduced as compared to the conventional technique. Furthermore, even if the drive chip has an advanced protection function, number of signal lines between the drive chip and the signal processing chip need not be particularly increased. Consequently, the internal wiring of the module can be simplified to reduce the manufacturing cost.

(d) Since the signal processing chip has a level shift function to match the potential of the signals exchanged between the signal processing chip and the drive chip on the high-voltage side of the bridge circuit, the internal wiring of the module can be simplified to reduce the cost as compared with a signal transmission method using a photocoupler.

The implementation in which all the drive chips have the same circuit configurations and are disposed close to the element chips is advantageous in that the cost and size of the module can be reduced. When a function for protecting the semiconductor element is incorporated in the drive chip, the drive chip operationally links with the signal processing chip via the defect signal in the form of a logic signal, thereby increasing resistance to the entry of noise and reducing the interference with the drive instruction in order to improve the operational reliability of the module.

What is claimed is:

1. A power semiconductor module having a bridge circuit and housed in a common case, comprising:

a plurality of element chips separated into groups for semiconductor elements, each element chip being formed physically separately as one single independent element;

a plurality of drive chips, each being formed physically separately as one single independent element and having an integrated drive circuit, each drive chip being connected to each of the semiconductor elements corresponding thereto and operating at a potential corresponding to each of the semiconductor elements;

a signal processing chip formed physically separately as one single independent element and having an integrated circuit, said signal processing chip being connected to the drive chips to be shared commonly by the drive chips and processing signals associated with the drive chips in such a way that the signals are compatible with the potentials of the drive chips;

wiring conductors for connecting the plurality of semiconductor elements; and signal lines for connecting the plurality of drive chips and the signal processing chip together, said plurality of said element chips said plurality of said drive chips and said signal processing chip connected by the wiring conductors and said signal lines being retained in a common case as one module.

2. A power semiconductor module according to claim 1, wherein all the drive chips are configured identically in the bridge circuit comprising the plurality of semiconductor elements, each drive chip being disposed close to a corresponding element chip to operate at a same potential as the corresponding element chip.

3. A power semiconductor module according to claim 1, wherein said bridge circuit includes upper and lower arm sides containing said drive chips, each of the drive chips on the upper-arm side of the bridge circuit having a feeding line for receiving a power voltage individually, and the drive chips on the lower-arm side having a common feeding line to be shared by the plurality of drive chips.

4. A power semiconductor module according to claim 1, wherein each of the drive circuits in the drive chips includes a protection circuit for protecting the semiconductor element when the semiconductor element corresponding to the drive circuit becomes defective, said signal processing chip sending a drive instruction to each of the drive chips via the signal lines and each of the drive chips in turn sending to the signal processing chip a defect signal indicating occurrence of a defect.

5. A power semiconductor module according to claim 1, wherein each of said drive chips is operated on a same reference potential as a corresponding semiconductor element, and on the upper-arm side of the bridge circuit, each semiconductor element has a potential transmission line for transmitting the reference potential to the signal processing chip, while on the lower-arm side, the semiconductor elements have a common potential transmission line.

6. A power semiconductor module according to claim 1, wherein said signal processing chip includes circuits for shifting levels of signals for the signal lines, each signal line being installed between the signal processing chip and each of the drive chips corresponding to the semiconductor elements on the upper-arm side of the bridge circuit.

7. A power semiconductor module according to claim 1, wherein each of the element chips has a free wheeling diode chip mounted close to each of the element chips, which is connected in reverse parallel with each of the semiconductor elements.

8. A power semiconductor module having a bridge circuit with upper and lower arm sides and housed in a common case, comprising:

a plurality of element chips separated into groups for semiconductor elements, each element chip being formed physically separately as one single independent element;

a plurality of drive chips, each being formed physically separately as one single independent element and having an integrated drive circuit, each drive chip being connected to each of the semiconductor elements corresponding thereto and operating at a potential corresponding to each of the semiconductor elements, each of the drive chips on the upper-arm side of the bridge circuit having a feeding line for receiving a power voltage individually and the drive chips on the lower-arm side of the bridge circuit having a common feeding line to be shared together;

a signal processing chip formed physically separately as one single independent element and having an integrated circuit, said signal processing chip being connected to the drive chips to be shared commonly by the drive chips and processing signals associated with the drive chips in such a way that the signals are compatible with the potentials of the drive chips, said signal processing chip having circuits for shifting levels of signals for the drive chips of the upper arm side as a part of the integrated circuit;

wiring conductors for connecting the plurality of semiconductor elements; and signal lines for connecting the drive chips and the signal processing chip together, the drive chips on the lower arm side being directly connected to the signal processing chip and the drive chips on the upper-arm side being connected to the signal processing chip through the circuits for shifting the levels corresponding thereto, said plurality of said element chips, said plurality of said drive chips and said signal processing chip connected by the wiring conductors and said signal lines being retained in a common case as one module.

* * * * *

UNITED STATES PATENT AND TRADEMARK OFFICE
CERTIFICATE OF CORRECTION

PATENT NO. : 5,896,286
DATED : April 20, 1999
INVENTOR(S) : Noriho Terasawa

It is certified that error appears in the above-indentified patent and that said Letters Patent is hereby corrected as shown below:

In column 1, line 13, change "IGBTS" to --IGBTs--;

In column 2, line 13, delete "a";
line 29 and line 65, change "controller chip 80" to --controller 80--, respectively;

In column 4, line 45, after "block" add "in the figure is provided for .... the plurality of drive chips" (words on line 8 to words on lines 38-39 in column 5);
line 55, change "warning signal Sa" to --delete signal Sa--;

In column 5, delete "in the figure is provided for .... the plurality of drive chips" (words on line 8 to words on lines 38-39);
In column 7,
line 31, after "said element chips" add a comma; and In Fig. 2, change "41"located between "Ec" and "Ee" to --41'--.

Signed and Sealed this

Seventh Day of December, 1999

Attest:

Attesting Officer

Q. TODD DICKINSON

Acting Commissioner of Patents and Trademarks